(12) United States Patent
Kim et al.

(10) Patent No.: US 11,654,403 B2
(45) Date of Patent: May 23, 2023

(54) POROUS FLUORINE-BASED RESIN COMPOSITE MEMBRANE AND MANUFACTURING METHOD THEREFOR

(71) Applicant: LG CHEM, LTD., Seoul (KR)

(72) Inventors: Sin Woo Kim, Daejeon (KR); Seijung Park, Daejeon (KR); Byeong In Ahn, Daejeon (KR); Hyun Seong Ko, Daejeon (KR)

(73) Assignee: LG CHEM, LTD., Seoul (KR)

( * ) Notice: Subject to any disclaimer, the term of this patent is extended or adjusted under 35 U.S.C. 154(b) by 344 days.

(21) Appl. No.: 17/044,745

(22) PCT Filed: Jul. 9, 2019

(86) PCT No.: PCT/KR2019/008432
§ 371 (c)(1),
(2) Date: Oct. 1, 2020

(87) PCT Pub. No.: WO2020/013578
PCT Pub. Date: Jan. 16, 2020

(65) Prior Publication Data
US 2021/0023509 A1 Jan. 28, 2021

(30) Foreign Application Priority Data
Jul. 12, 2018 (KR) .................. 10-2018-0081250

(51) Int. Cl.
*B01D 71/32* (2006.01)
*B01D 67/00* (2006.01)
*B01D 69/02* (2006.01)
*B01D 69/12* (2006.01)

(52) U.S. Cl.
CPC ......... *B01D 71/32* (2013.01); *B01D 67/0093* (2013.01); *B01D 69/02* (2013.01); *B01D 69/12* (2013.01); *B01D 2325/02* (2013.01); *B01D 2325/04* (2013.01); *B01D 2325/38* (2013.01)

(58) Field of Classification Search
None
See application file for complete search history.

(56) References Cited

U.S. PATENT DOCUMENTS

| | | | |
|---|---|---|---|
| 4,954,388 A * | 9/1990 | Mallouk ................ | C08J 5/2281 204/295 |
| 6,126,849 A | 10/2000 | Yamana et al. | |
| 8,575,287 B2 | 11/2013 | Higuchi et al. | |
| 9,877,094 B2 | 1/2018 | Mori et al. | |
| 2002/0060304 A1 | 5/2002 | Ishikawa et al. | |
| 2003/0026997 A1 | 2/2003 | Qiu et al. | |
| 2003/0054155 A1* | 3/2003 | Nomi ................ | C08J 7/0427 428/319.3 |
| 2009/0325849 A1 | 12/2009 | Götz et al. | |
| 2013/0108845 A1 | 5/2013 | Tee | |
| 2013/0283744 A1 | 10/2013 | Nakamura et al. | |
| 2020/0147537 A1 | 5/2020 | Kim et al. | |

FOREIGN PATENT DOCUMENTS

| | | |
|---|---|---|
| CN | 101506257 A | 8/2009 |
| CN | 101190975 B | 8/2010 |
| CN | 103085348 A | 5/2013 |
| CN | 104437126 A | 3/2015 |
| CN | 105085793 A | 11/2015 |
| CN | 106474941 A | 3/2017 |
| CN | 108018718 A | 5/2018 |
| EP | 3626335 A1 | 3/2020 |
| GB | 2448014 A | 10/2008 |
| GB | 2496224 A | 5/2013 |
| JP | S62-064373 A | 3/1987 |
| JP | 2001-315236 A | 11/2001 |
| JP | 2020-524726 A | 8/2020 |
| KR | 10-2000-0016701 A | 3/2000 |
| KR | 10-0679898 B1 | 2/2007 |
| KR | 10-0775150 B1 | 11/2007 |
| KR | 10-2009-0076898 A | 7/2009 |
| KR | 10-2016-0083028 A | 7/2016 |
| KR | 10-2019-0060696 A | 6/2019 |
| WO | 1995-026881 A1 | 10/1995 |
| WO | 2009-142080 A1 | 11/2009 |

OTHER PUBLICATIONS

Extended European Search Report dated Mar. 29, 2021, of the corresponding European Patent Application No. 19833070.6, 7 pages.
International Search Report issued for International Application No. PCT/KR2019/008432 dated Nov. 5, 2019, 6 pages.
Unidyne TG-5673, Daikin Chemical Europe GmbH, 2015, 2 pages.

* cited by examiner

*Primary Examiner* — Ryan B Huang

(74) *Attorney, Agent, or Firm* — Rothwell, Figg, Ernst & Manbeck, P.C.

(57) ABSTRACT

The present disclosure relates to a porous fluorine-based resin composite membrane having excellent water repellency and oil repellency, and a method for producing the same.

8 Claims, 1 Drawing Sheet

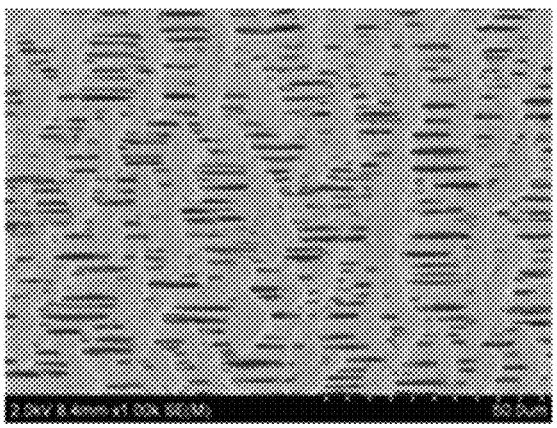
(a)
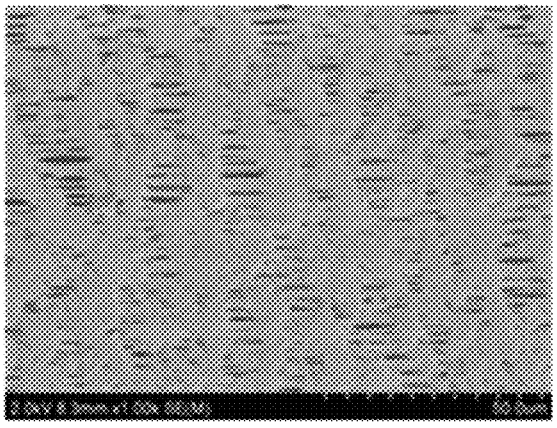
(b)

POROUS FLUORINE-BASED RESIN COMPOSITE MEMBRANE AND MANUFACTURING METHOD THEREFOR

CROSS-REFERENCE TO RELATED APPLICATION(S)

This application is a 35 U.S.C. 371 National Phase Entry Application from PCT/KR2019/008432 filed on Jul. 9, 2019, designating the United States, which claims the benefit of Korean Patent Application No. 10-2018-0081250 filed on Jul. 12, 2018 with the Korean Intellectual Property Office, the disclosure of which is herein incorporated by reference in its entirety.

TECHNICAL FIELD

The present invention relates to a porous fluorine-based resin composite membrane having excellent water repellency and oil repellency, and a method for producing the same.

BACKGROUND OF THE INVENTION

Fluorine-based porous membrane may have properties such as high heat resistance, chemical stability, weatherability, non-flammability, strength, non-adhesiveness, and low friction coefficient, which are caused by the fluorine-based resin itself, and additionally, when producing a porous body, it may have properties such as flexibility, liquid permeability, particle collection efficiency, and low dielectric constant.

Among these fluorine-based resins, in particular, porous membranes produced using polytetrafluoroethylene (PTFE) have high stability to various compounds, and thus are widely used as a microfiltration filter (membrane filter) for gas and liquid mixtures in semiconductor-related fields, liquid crystal-related fields, foods, medical-related fields, and the like.

Such a microfiltration filter is used for cases of various devices, and for example, it is applied to lamps, motors, various sensors, electrical equipment for automobiles represented by pressure switches, mobile phones, cameras, electric razors, electric toothbrushes, and outdoor lamps.

However, when such a porous membrane is applied as a patch-type product, it is necessary to implement water and oil repellent properties. However, the water- and oil-repellent agents, which are often used to implement water and oil repellent properties on porous membranes, are mainly in the form of water dispersion and has a high surface tension. On the contrary, the porous membrane as a substrate has a low surface tension, which causes a problem that smooth wetting and coating are difficult.

In addition, because of the nature of the porous material, liquid can be penetrated into both surfaces of the porous membrane, and thus, it is necessary to realize water and oil repellency properties of both surfaces by a single coating process.

BRIEF SUMMARY OF THE INVENTION

The present disclosure provides a porous fluorine-based composite membrane having excellent water repellency and oil repellency.

The present disclosure also provides a method for producing a porous fluorine-based resin composite membrane having excellent water repellency and oil repellency.

In one aspect, a porous fluorine-based resin composite membrane comprising: a porous fluorine-based resin layer having pores formed therein; and a coating layer which is formed on at least one surface of the porous fluorine-based resin layer and an outer surface of the pores, and includes a (co)polymer containing a repeating unit derived from a perfluoroalkyl acrylate having 1 to 10 carbon atoms is provided herein.

In another aspect, a method for producing a porous fluorine-based resin composite membrane comprising the steps of: preparing a coating solution including a (co)polymer containing repeating units derived from a perfluoroalkyl acrylate having 1 to 10 carbon atoms and a perfluoroalkanoic acid having 3 to 10 carbon atoms; and coating the coating solution onto at least one surface of the porous fluorine-based resin layer and an outer surface of the pores is provided herein.

DETAILED DESCRIPTION OF THE INVENTION

Hereinafter, the porous fluorine-based resin composite membrane and the production method thereof according to specific embodiments of the present disclosure will be described in more detail.

The technical terms used herein is for the purpose of describing exemplary embodiments only and is not intended to limit the scope of the invention. The singular forms "a," "an" and "the" are intended to include plural forms, unless the context clearly indicates otherwise. It should be understood that the terms "comprise," "include", "have", etc. are used herein to specify the presence of stated features, numbers, steps, components or combinations thereof, but do not preclude the presence or addition of one or more other features, numbers, steps, components, or combinations thereof.

Further, in the present disclosure, in case where a layer or an element is mentioned to be formed "on" or "above" layers or elements, it means that the layer or element is directly formed on the layers or elements, or it means that other layers or elements may be additionally formed between layers or on a subject or substrate.

Since a variety of modification may be made to the present disclosure and there may be various forms of the present disclosure, its specific examples are illustrated and will be described in detail below. However, it should be understood that this is not intended to limit the present disclosure to particular forms disclosed herein, and the present disclosure compasses all modifications, equivalents or alternatives falling within the spirit and technical scope of the present disclosure.

In the present disclosure, the (co)polymer refers to including both a polymer and a copolymer.

According to one embodiment of the present disclosure, a porous fluorine-based resin composite membrane can be provided, comprising: a porous fluorine-based resin layer having pores formed therein; and a coating layer which is formed on at least one surface of the porous fluorine-based resin layer and an outer surface of the pores, and includes a (co)polymer containing a repeating unit derived from a perfluoroalkyl acrylate having 1 to 10 carbon atoms.

The present inventors have found through experiments that when the porous fluorine-based resin composite membrane comprises: a porous fluorine-based resin layer having pores formed therein; and a coating layer which is formed on at least one surface of the porous fluorine-based resin layer and an outer surface of the pores, and includes a (co)polymer containing a repeating unit derived from a perfluoroalkyl acrylate having 1 to 10 carbon atoms, it has excellent water repellency and oil repellency, can improve an air permeability and can improve oil repellency properties of both surfaces, thereby completing the present disclosure.

Pores are formed in the porous fluorine-based resin layer, and the pores are defined as void spaces in which no fluorine-based resin or other components are present. Accordingly, the outer surface of the pores means a portion surrounding the space of the pores with the fluorine-based resin or other component.

Generally, in the course of producing a fluorine-based resin membrane, it is known to use a method of forming a coating layer having a water-repellent and oil-repellent function in the porous fluorine-based resin layer or a method of impregnating a porous fluorine resin layer into a solution containing a component having a water-repellent and oil-repellent function. However, due to the high surface energy of the porous fluorine-based resin layer or for other reasons, there has been a limit in penetrating the component having the water-repellent and oil-repellent function into the inside of the porous fluorine-based resin layer.

Meanwhile, according to the present disclosure, in the course of forming the porous fluorine-based resin composite membrane, a perfluoroalkanoic acid having 3 to 10 carbon atoms is included in a coating solution coated onto the porous fluorine-based resin layer, like the production method described hereinafter, and thereby, it allows the components exhibiting water and oil repellent properties (for example, a (co)polymer containing a repeating unit derived from a perfluoroalkyl acrylate having 1 to 10 carbon atoms) to remain and bond not only to the outside of the porous fluorine-based resin layer but also to the inside and outside of the pores.

Thereby, in the porous fluorine-based resin composite membrane, the coating layer including the (co)polymer containing a repeating unit derived from a perfluoroalkyl acrylate having 1 to 10 carbon atoms may be formed not only on any one surface of the porous fluorine-based resin layer but also on the outer surface of the pores existing inside the fluorine-based resin layer. For these reasons, the porous fluorine-based resin composite membrane of the embodiment can have greatly improved water repellency and oil repellency as compared with the conventional non-water-based resin membrane in which the coating layer having the water and oil repellent function is formed only on the outer surface. Further, the porous fluorine-based resin composite membrane can achieve excellent oil repellency properties on both sides and edge portions even by a single coating step.

Meanwhile, the porous fluorine-based resin layer may have a thickness of 5 to 300 μm. When the thickness of the porous fluorine-based resin layer exceeds 300 μm, production efficiency is remarkably reduced, and when the thickness is less than 5 μm, the mechanical properties are weak, which may cause wrinkles and pinholes during the process.

Meanwhile, although the porous fluorine-based resin layer has pores formed therein, these pores may have a diameter of 150 to 6000 nm.

When the pores inside the porous fluorine-based resin layer have a diameter within the above range, the coating solution is impregnated and maintained in the pores to enable a stable process. When the diameter of the pores exceeds 6000 nm, the amount of the coating solution lost to the outside of the resin layer increases, so that problems such as contamination of surface may occur. When the diameter is less than 150 nm, the permeation of the coating solution into the resin layer is reduced, which may make it difficult to achieve good oil repellency grade of both surfaces. The diameter of pores can be measured by Capillary Flow Porometry (CFP) method.

Meanwhile, the coating layer formed on at least one surface of the porous fluorine-based resin layer and the outer surface of the pores includes a (co)polymer containing a repeating unit derived from a perfluoroalkyl acrylate having 1 to 10 carbon atoms, wherein the (co)polymer may include a (co)polymer of perfluoroalkyl acrylate having 1 to 10 carbon atoms-alkyl acrylate having 1 to 10 carbon atoms-vinyl chloride-crosslinkable monomer.

Specifically, the crosslinkable monomer may mean a monomer having a hydroxyl group, a carboxyl group, an epoxy group, or a nitrogen-containing functional group such as an isocyanate group, urethane, amine, amide, urea, and the like.

Examples thereof may include at least one selected from the group consisting of a hydroxyl group-containing monomer such as hydroxy alkyl(meth)acrylate or hydroxyalkyleneglycol(meth)acrylate; a carboxyl group-containing monomer such as (meth)acrylic acid, 2-(meth)acryloyloxyacetic acid, 3-(meth)acryloyloxypropyl acid, 4-(meth)acryloyloxybutyric acid, acrylic acid dimer, itaconic acid, maleic acid and maleic anhydride; or nitrogen-containing monomer such as a (meth)acrylamide N-vinylpyrrolidone or N-vinylcaprolactam, and the like.

Meanwhile, specific examples of the fluorine-based resin of the embodiment are not limited, but may be a fluorine-based compound that can be generally used. Examples thereof may be one or more fluorine-based compounds selected from the group consisting of polytetrafluoroethylene (PTFE), tetrafluoroethylene-perfluoroalkyl vinyl ether copolymer (PFA), tetrafluoroethylene-tetrafluoroethylene-hexafluoropropylene copolymer (FEP), ethylene-tetrafluoroethylene copolymer resin (ETFE), tetrafluoroethylene-chlorotrifluoroethylene copolymer (TFE/CTFE) and ethylene-chlorotrifluoroethylene resin (ECTFE).

The fluorine-based resin such as polytetrafluoroethylene (PTFE) is a plastic having excellent heat resistance and chemical resistance, and the porous fluorine-based resin composite membrane produced from the fluorine-based resin can be widely used as a filter medium for corrosive gas and liquid, a permeable membrane for electrolysis, and a battery separator. Further, it can be used to precisely filter a variety of gases and liquids used in the semiconductor industry.

Meanwhile, the oil repellency grade (AATCC-118) of any one surface of the porous fluorine-based resin composite membrane and another surface forming the remaining part may be 6 grade or higher. When the oil repellency grade becomes 6 grade or higher, it may contribute to the stabilization of the porous composite membrane structure.

When evaluated according to the oil repellency evaluation-related standards, the oil repellency grade of the porous fluorine-based resin layer before formation of the coating layer is 4 grade, and the oil repellency grade after formation of the coating layer is a level of 6 grade or higher, preferably 6 to 8, and thus, it can prevent a liquid having a low surface tension such as a solvent and an oil from passing through the porous composite membrane, can achieve perfect liquid proofing performance, and can block the device inside the membrane from the external liquid, and does not block the pores, which is thus effective in maintaining air permeability.

In particular, as compared with the oil repellency grade of any one surface of the porous fluorine-based resin composite membrane, the porous fluorine-based resin composite membrane of the present disclosure can also maintain the oil repellency grade of another surface forming the remaining part at a high level as well. Therefore, the oil repellency grade of any one surface and the oil repellency grade of another surface forming the remaining part may have symmetry with each other.

According to another embodiment of the present disclosure, there can be provided a method for producing a porous fluorine-based resin composite membrane comprising the steps of: preparing a coating solution including a (co)polymer containing repeating units derived from a perfluoroalkyl acrylate having 1 to 10 carbon atoms and a perfluoroalkanoic acid having 3 to 10 carbon atoms, and coating the coating solution onto at least one surface of the porous fluorine-based resin layer and an outer surface of the pores.

The present inventors have produced a porous fluorine-based resin composite membrane using a coating solution including a (co)polymer containing repeating units derived from a perfluoroalkyl acrylate having 1 to 10 carbon atoms and a perfluoroalkanoic acid having 3 to 10 carbon atoms, and confirmed through experiments that the porous fluorine-based resin composite membrane thus produced can have excellent water repellency and oil repellency by forming a coating layer on at least one surface of the porous fluorine-based resin layer and an outer surface of the pores, respectively, thereby completing the present disclosure.

In the method for producing a porous fluorine-based resin composite membrane of the embodiment, as a perfluoroalkanoic acid having 3 to 10 carbon atoms is included in a coating solution which is coated onto the porous fluorine-based resin layer in the course of forming the porous fluorine-based resin composite membrane, it allows the components exhibiting water and oil repellent properties (for example, (co)polymer containing repeating units derived from a perfluoroalkyl acrylate having 1 to 10 carbon atoms) to remain and bond not only to the outside of the porous fluorine-based resin layer but also to the inside and outside of the pores.

The coating solution includes a (co)polymer containing a repeating unit derived from a perfluoroalkyl acrylate having 1 to 10 carbon atoms and a perfluoroalkanoic acid having 3 to 10 carbon atoms, and due to the low surface tension, it can be wetted not only on one side of the porous fluorine-based resin layer, but also on the outer surface of the pores present therein.

Specifically, the perfluoroalkanoic acid having 3 to 10 carbon atoms may be dissolved in a solvent to exhibit surfactant action, and thereby, the surface tension is lowered to the extent that the coating solution can penetrate into the porous fluorine-based resin layer, and the coating solution may remain wet and remain not only on the outside of the porous fluorine-based resin layer but also on the inside and outside of the pores, thereby forming a coating layer on each surface.

Therefore, the step of coating the coating solution onto at least one surface of the porous fluorine-based resin layer and an outer surface of the pores may be performed as a single step, and a coating layer can be formed respectively on at least one of the porous fluorine-based resin layer and an outer surface of the pores by a single step. Thus, the coating layer can be formed more smoothly and production cost when forming the coating layer can be reduced. In addition, this can lead to the effect of remarkably improving the productivity of the porous fluorine-based resin composite membrane.

At this time, the (co)polymer containing a repeating unit derived from a perfluoroalkylacrylate having 1 to 10 carbon atoms may include a (co)polymer of perfluoroalkyl acrylate having 1 to 10 carbon atoms-alkyl acrylate having 1 to 10 carbon atoms-vinyl chloride-crosslinkable monomer, and the crosslinkable monomer may mean a monomer having a hydroxyl group, a carboxyl group, an epoxy group, or a nitrogen-containing functional group such as an isocyanate group, urethane, amine, amide, urea, and the like.

Examples thereof may include at least one selected from the group consisting of a hydroxyl group-containing monomer such as hydroxy alkyl(meth)acrylate or hydroxyalkylene glycol(meth)acrylate; a carboxyl group-containing monomer such as (meth)acrylic acid, 2-(meth)acryloyloxyacetic acid, 3-(meth)acryloyloxypropyl acid, 4-(meth)acryloyloxybutyric acid, 4-acrylic acid dimer, itaconic acid, maleic acid and maleic anhydride; and a nitrogen-containing monomer such as (meth)acrylamide, N-vinylpyrrolidone or N-vinylcaprolactam, and the like.

Meanwhile, the coating solution may include 2 to 10% by weight of a (co)polymer containing a repeating unit derived from a perfluoroalkyl acrylate having 1 to 10 carbon atoms and 5 to 15% by weight of a perfluoroalkanoic acid having 3 to 10 carbon atoms.

The (co) polymer containing a repeating unit derived from a perfluoroalkyl acrylate having 1 to 10 carbon atoms in the coating solution may form a coating layer and exhibit liquid proofing effect such as water repellency or oil repellency. When the content thereof exceeds 10% by weight, there may be a problem that the polymer may not rapidly penetrate into the porous fluorine-based resin layer, and block the surface, which may cause loss of air permeability. If the content is less than 2% by weight, it is likely that it cannot realize sufficient coating level and thus cannot achieve desired physical properties.

In addition, the perfluoroalkanoic acid having 3 to 10 carbon atoms in the coating solution may be dissolved in a solvent to exhibit surfactant action. When the content thereof exceeds 15% by weight, it may cause a problem that the solubility of the coating solution is reduced by making the pH in the entire blending too low. When the content is less than 5% by weight, the surface tension cannot be sufficiently lowered, and thus it is likely that the coating solution is not sufficiently wetted on the outer surface of the pores.

Meanwhile, the coating solution may additionally include an amine compound or ammonia together with a (co)polymer containing a repeating unit derived from a perfluoroalkyl acrylate having 1 to 10 carbon atoms and a perfluoroalkanoic acid having 3 to 10 carbon atoms.

The amine compound or ammonia may exhibit the effect of improving the stability of the coating solution by neutralizing the blend having strong acidity due to dissolution of perfluoroalkanoic acid. When the coating solution further includes an amine compound or ammonia, these effects can further improve water repellency and oil repellency of the porous fluorine-based resin composite membrane.

The amine compound may be one type selected from the group consisting of an aliphatic amine having 1 to 20 carbon atoms, an aromatic amine having 1 to 30 carbon atoms, or ammonia, or mixtures thereof. The aliphatic and aromatic amines may be each primary to tertiary amines, and specifically, it may be ammonia, trimethylamine or triethylamine.

The amine compound or ammonia may be contained in an amount of 0.1 to 5% by weight based on the total weight of the perfluoroalkanoic acid having 3 to 10 carbon atoms and amine compound or ammonia. When an amine compound or ammonia is included in such a content, it is possible to maximize the effect of neutralizing the above-mentioned strongly acidic blend and improving the stability of the coating solution.

At this time, when the content of the amine compound or ammonia exceeds 5% by weight based on the total weight of the perfluoroalkanoic acid having 3 to 10 carbon atoms and amine compound or ammonia, it may be a problem that the blend shows excessive basicity and the stability of the coating solution decreases. When the content is less than 0.1% by weight, the blend shows strong acidity, resulting in precipitation or aggregation of the copolymer to be coated, which may be technically disadvantageous.

The coating solution may further include an organic solvent or water, wherein the organic solvent may be an alcohol having 1 to 8 carbon atoms, and specifically, it may be methanol, ethanol, n-propanol, isopropanol, 1-butanol or 1-hexanol.

The content of the organic solvent or water is not particularly limited, and is sufficient if it is possible to dissolve the (co)polymer containing a repeating unit derived from the perfluoroalkyl acrylate having 1 to 10 carbon atoms and the perfluoroalkanoic acid having 3 to 10 carbon atoms. For example, the coating solution may include 0 to 20% by weight of an alcohol-based solvent and 45 to 91% by weight of water.

Meanwhile, during the production of the porous fluorine-based resin composite membrane, after the step of coating the coating solution onto at least one surface of the porous fluorine-based resin layer having pores formed therein and an outer surface of the pores, the method may further include a step of decomposing the perfluoroalkanoic acid having 3 to 10 carbon atoms.

As described above, the perfluoroalkanoic acid having 3 to 10 carbon atoms in the coating solution can be dissolved in a solvent to exhibit surfactant action, thereby exhibiting the effect of enabling the coating solution to have permeability to the porous fluorine-based resin layer. This is decomposed and removed during the drying process of the coating solution, and does not remain in the finally formed porous fluorine-based resin composite membrane.

Therefore, the finally formed porous fluorine-based resin composite membrane no longer exhibits problems that perfluoroalkanoic acid is eluted or precipitated on the surface by polar solvents such as water or alcohols, thereby providing a stable composite membrane that does not generate secondary liquid penetration, and having excellent water repellency and oil repellency.

The method and conditions for decomposing the perfluoroalkanoic acid having 3 to 10 carbon atoms are not particularly limited, and for example, it may be performed through a drying process at a temperature of 200° C. or less. Specifically, it may be performed at a temperature of 50° C. to 200° C., or 100° C. to 200° C.

Advantageous Effects

The present disclosure can provide a porous fluoropolymer composite membrane having excellent water repellency and oil repellency, and a method for producing the porous fluorine-based resin composite membrane having excellent water repellency and oil repellency.

BRIEF DESCRIPTION OF THE DRAWINGS

FIG. 1 shows an electron microscope photograph (SEM) of (a) any one surface and (b) another surface forming the remaining part, of the porous fluorine-based resin membrane of Example 1 of the present disclosure. (1 K magnification)

DETAILED DESCRIPTION OF THE EMBODIMENTS

The present disclosure will be described in more detail by way of the examples provided below. However, the following examples are for illustrative purposes only and the scope of the present invention is not limited to or by the examples.

In the following Examples or Comparative Examples, TG-5673 available from Daikin Industries was used as a (co)polymer containing a repeating unit derived from a perfluoroalkyl acrylate having 1 to 10 carbon atoms, and perfluorohexanoic acid (PFHA) was used as a perfluoroalkanoic acid having 3 to 10 carbon atoms.

Preparation Example: Preparation of Porous Fluorine-Based Resin Layer

A uniaxially-stretched porous fluorine-based resin layer was produced through preform-extrusion-calender & drying-MD stretching-heat setting.

That is, 100 parts by weight of polytetrafluoroethylene powder (CD145E, manufactured by AGC Co.) was mixed with 22 parts by weight of a liquid lubricant (product name: "Isopar H", manufactured by Exxon Co.) to prepare a single-layer preform.

Then, the single-layer preform was extruded at a rate of 50 mm/min at a temperature of 50° C. to prepare a sheet having a thickness of about 300 μm. The prepared sheet was heated at a temperature of about 200° C. to completely dry and remove the liquid lubricant.

Then, after the drying process, the preform was uniaxially stretched under the conditions in Table 1 below. The fabric refers to a uniaxially stretched porous fluorine-based resin layer, and an oil repellency grade of the fabric was 4 grade level.

TABLE 1

| | |
|---|---|
| Thickness, μm | 190 |
| Porosity, % | 65.1 |
| Pore size mean/max, nm | 315/720 |
| Gurley, sec | 49 |
| Water pressure resistance, MPa | 0.190 |

Pore size was measured by Capillary Flow Porometry (CFP) method.

Example 1

TG-5673 available from Daikin Industries was dissolved in a solvent such that the solid content was 5 parts by weight. As the solvent, isopropyl alcohol and water were used in an amount of 9 and 76 parts by weight in the entire blending.

9.5 parts by weight of perfluorohexanoic acid (PFHA) and 0.5 part by weight of ammonia were used to prepare a mixture in which the total content of fluorohexanoic acid and ammonia was 10 parts by weight.

To the solution in which the TG-5673 solid was dissolved, a mixture of perfluorohexanoic acid and ammonia was added to prepare a coating solution.

The coating solution prepared above was coated onto one surface of the porous fluorine-based resin layer of the Preparation Example using a Mayer bar, and then dried at 160° C. for 5 minutes to produce a porous fluorine-based resin composite membrane.

Example 2

A porous fluorine-based resin composite membrane was produced by performing the same method as in Example 1, except that the coating solution having the composition shown in Table 2 below was used.

Comparative Example 1

A porous fluorine-based resin composite membrane was produced by performing the same method as in Example 1, except that the coating solution having the composition shown in Table 2 below was used.

Comparative Example 2

A porous fluorine-based resin composite membrane was produced by performing the same method as in Example 1, except that hydrocarbon-based hexanoic acid (HA) was used instead of fluorine-based perfluorohexanoic acid, and a coating solution having the composition shown in Table 2 below was used.

TABLE 2

| Coating solution | Example 1 | Example 2 | Comparative Example 1 | Comparative Example 2 |
|---|---|---|---|---|
| TG-5673 Solid content (wt %) | 5.00 | 2.80 | 5.00 | 5.00 |
| PFHA (wt %) | 9.50 | 9.50 | 0 | 0 |
| HA (wt %) | 0 | 0 | 0 | 9.50 |
| Ammonia | 0.50 | 0.50 | 0 | 0.50 |
| Isopropyl alcohol | 9.00 | 9.00 | 9.00 | 9.00 |
| Water | 76.00 | 78.20 | 86.00 | 76.00 |

Experimental Example

The following properties were measured or evaluated for the porous fluorine-based resin composite membranes produced in the Examples and Comparative Examples, and the results are summarized in Table 3 below.

(1) Oil Repellency Grade (AATCC-118)

According to the measurement method specified in AATCC-118, the oil repellency grade of the porous fluorine-based resin composite membrane was measured using a straight chain hydrocarbon solvent.

At this time, any one surface of the porous fluorine-based resin composite membrane was represented by a first surface, and another surface forming the remaining part was represented by a second surface.

(2) Air Permeability

The air permeability was measured using a Gurley-type Densometer (No. 158) available from Toyoseiki, based on the measurement method (JIS Gurley) specified in Japanese Industrial Standards.

More specifically, the air permeability was defined as the time (unit: second/100 mL) required for 100 mL of air to pass through a 1-inch square membrane under a constant air pressure of 4.8 inch.

TABLE 3

| | Example 1 | Example 2 | Comparative Example 1 | Comparative Example 2 |
|---|---|---|---|---|
| Oil repellency grade of first surface | 8 | 6 | 8 | 8 |
| Oil repellency grade of second surface | 8 | 6 | 4 | 4 |
| Air permeability (sec/100 cc) | 24 | 26 | 130 | 95 |

As a result of the experiment, in the case of Examples 1 and 2 using a coating solution containing a perfluorohexanoic acid and ammonia in a (co)polymer containing a repeating unit derived from a perfluoroalkyl acrylate having 1 to 10 carbon atoms, it was confirmed that the oil repellency grade of the first and second surfaces in the obtained porous fluorine-based resin composite membrane was 6 or more, respectively, and the oil repellency grade of the first and second surfaces showed symmetry with each other.

In contrast, in the case of Comparative Examples 1 and 2, it was confirmed that the oil repellency grade of the second surface was reduced compared to the first surface. Thereby, it was found that the porous fluorine-based resin composite membrane according to the present disclosure had coating layers formed on both sides of the porous fluorine-based resin layer and the outer surfaces of the pores, so that both sides of the produced porous fluorine-based resin composite membrane had excellent water repellency and oil repellency.

In addition, it was confirmed that the air permeability of Examples 1 and 2 was 24 sec/100 cc and 26 sec/100 cc, which were extremely low values as compared with Comparative Examples 1 and 2, and thus had very excellent air permeability.

Therefore, it has been found that the porous fluorine-based resin composite membrane of the present disclosure had excellent air permeability, and could effectively prevent water permeability even while having high permeability to liquids other than gas and water.

The invention claimed is:

1. A method for producing a porous fluorine-based resin composite membrane comprising the steps of:
   providing a porous fluorine-based resin layer having pores therein,
   preparing a coating solution including a (co)polymer containing a repeating unit derived from a perfluoroalkyl acrylate having 1 to 10 carbon atoms and a perfluoroalkanoic acid having 3 to 10 carbon atoms,
   coating the coating solution onto at least one surface of the porous fluorine-based resin layer and an outer surface of the pores to produce a coating layer, and
   decomposing the perfluoroalkanoic acid having 3 to 10 carbon atoms from the coating layer.

2. The method for producing a porous fluorine-based resin composite membrane according to claim 1,
   wherein the (co)polymer includes a (co)polymer of perfluoroalkyl acrylate having 1 to 10 carbon atoms, alkyl acrylate having 1 to 10 carbon atoms, vinyl chloride, and a crosslinkable monomer.

3. The method for producing a porous fluorine-based resin composite membrane according to claim 2,
   wherein the crosslinkable monomer is a monomer having a hydroxyl group, a carboxyl group, an epoxy group, or a nitrogen-containing functional group, wherein the nitrogen-containing functional group is an isocyanate group, urethane, amine, amide, or urea.

4. The method for producing a porous fluorine-based resin composite membrane according to claim 1, wherein the coating solution includes 2 to 10% by weight of the (co)polymer and 5 to 15% by weight of the perfluoroalkanoic acid having 3 to 10 carbon atoms.

5. The method for producing a porous fluorine-based resin composite membrane according to claim 1,
wherein the coating solution further includes an amine compound or ammonia.

6. The method for producing a porous fluorine-based resin composite membrane according to claim 5,
wherein the amine compound or ammonia is contained in an amount of 0.1 to 5% by weight based on the total weight of the perfluoroalkanoic acid having 3 to 10 carbon atoms and amine compound or ammonia.

7. The method for producing a porous fluorine-based resin composite membrane according to claim 1,
wherein the coating solution further includes an organic solvent or water.

8. The method for producing a porous fluorine-based resin composite membrane according to claim 1,
wherein the step of coating the coating solution onto the at least one surface of the porous fluorine-based resin layer and the outer surface of the pores is performed as a single step.

\* \* \* \* \*